United States Patent [19]

Wellington et al.

[11] 4,097,129
[45] Jun. 27, 1978

[54] COUPLING DEVICE FOR PROTECTIVELY JACKETED FIBERS

[75] Inventors: Charles K. Wellington, Westford; Mark L. Dakss, Waltham, both of Mass.

[73] Assignee: GTE Laboratories Incorporated, Waltham, Mass.

[21] Appl. No.: 689,753

[22] Filed: May 25, 1976

[51] Int. Cl.² .............................................. G02B 5/16
[52] U.S. Cl. ............................... 350/96.15; 350/96.21
[58] Field of Search ............. 350/96 C, 96 B, 96 WG

[56] References Cited

U.S. PATENT DOCUMENTS

| 3,734,594 | 5/1973 | Trambarulo | 350/96 C |
|---|---|---|---|
| 3,871,744 | 3/1975 | Bridger et al. | 350/96 C |
| 3,880,452 | 4/1975 | Fields | 350/96 C |
| 3,972,585 | 8/1976 | Dalgleish et al. | 350/96 C |
| 3,982,815 | 9/1976 | Nakayama | 350/96 C |

OTHER PUBLICATIONS

Millet, "Connector Mount for Fiber Optic Bundle", IBM Tech. Disc. Bulletin, vol. 14, No. 3, Aug. 1971.

*Primary Examiner*—John K. Corbin
*Assistant Examiner*—Stewart Levy
*Attorney, Agent, or Firm*—David M. Keay; Robert A. Seldon

[57] ABSTRACT

A device for coupling a pair of optical fibers is disclosed comprising a resiliently compressible body for holding a pair of opposing protectively jacketed fibers in end-to-end abutment within an oversized bore. The body is symmetrically compressed about its central portion to reduce the bore cross-section to a fiber-engaging dimension around the bare fiber tips thereby securely aligning the fibers. Similarly, the body is compressed about its end portions to decrease the bore cross-section to a jacket-clamping dimension whereby stresses in the spliced region are distributed along the fiber jacket.

18 Claims, 8 Drawing Figures

COUPLING DEVICE FOR PROTECTIVELY JACKETED FIBERS

FIELD OF THE INVENTION

This invention relates to optical fibers. The fibers have potential use in communication systems for guiding light beams carrying voice, television, and high speed data signals. One important area of technology that is required if optical fiber communication systems are to be implemented is the development of useful techniques for in-the-field fiber splicing. Efficient splicing of a pair of optical fibers demands minimal lateral and longitudinal separation of the fiber tips, and angular alignment thereof. The tolerance for the longitudinal separation is generally the least critical of the three owing to the small degree of divergence of the light travelling between the tips, and to an index matching fluid which may be deposited between the fiber tips to substantially reduce the divergence.

Angular misalignment may be minimized by proper location of the fibers in channels. Lateral separation, that is to say the non-coincidence of the optical axes of the spliced fibers, is the most critical parameter, and must therefore be held within very exacting tolerances when a pair of optical fibers are to be spliced. For example, a splice achieving a loss as low as 0.1 db requires a separation of no more than about 10% of the core radius, or approximately 0.0001 inch for a typical fiber.

SUMMARY OF THE PRIOR ART

Several techniques have been proposed for accomplishing the splicing operation, including the insertion of fibers into opposite ends of a capillary glass tube (U.S. Pat. No. 3,902,785) or a tapered glass tube (see "Connector for Multimode Fibers"; Siemens Forsch. —u. Entwickl. Bericht.; 2 (1973) 204–5), or the slipping of a metal sleeve over two adjacent fiber ends, followed by crimping of the sleeve (see U.S. Pat. No. 3,768,146). Since accurate alignment has heretofore required a tight-fitting hole, the foregoing are rather precarious procedures owing to the fragility of the optical fiber; there is a tendency for the fibers to break when pushed through a tight capillary. Additionally, the stresses to which the spliced fibers are subjected are transmitted along the bare fibers and the resistance of the splices to these stresses are thereby limited by the relatively weak strength of the optical fibers. None of these techniques treat the consideration that the fibers will be protectively jacketed and that the jacketing must be safely anchored as part of the splice.

Another splicing technique requires that the fibers be accurately spaced within fabricated ribbons, so that the ends of mating fibers may then be aligned by aligning the ribbons, or by putting a clamp plate with round grooves over the fibers and gluing the fibers together (see U.S. Pat. No. 3,798,099). While the protective jacketing is taken into account, the accurate spacing required between the fibers of the ribbon is, however, difficult to obtain.

SUMMARY OF THE INVENTION

It is, therefore, an object of the invention to efficiently couple protectively jacketed fibers.

It is a further object of the invention to efficiently couple protectively jacketed fibers in a manner which minimizes strain-related breakage.

It is a still further object of the invention to couple protectively jacketed fibers in a manner which allows simple decoupling without damage to the fibers.

It is another object of the invention to provide a reusable splicer.

It is another object of the invention to couple fibers of varying and mismatched dimensions.

These and other objects are accomplished by a device for coupling a pair of protectively jacketed optical fibers in axial alignment which comprises a resiliently compressible body for holding a pair of opposing fibers in end-to-end abutment in an abutment region. The body receives the fiber pairs through opposite ends of a fiber-receiving bore formed axially therethrough. The bore has an oversized cross-section with respect to the cross-sections of the received fibers. Body compression means are provided for forming a plurality of fiber-engaging areas along the bore wall which exert a lateral aligning force on the abuttingly held fibers.

The invention together with further objects and advantages can be best understood with reference to the following detailed description in conjunction with the drawings.

DESCRIPTION OF THE PREFERRED EMBODIMENTS

Figure 1:
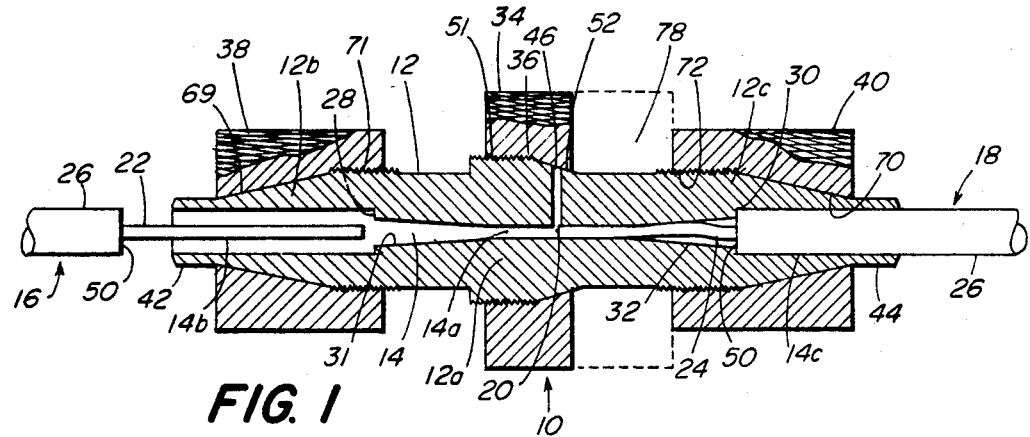
FIG. 1 is a sectional view of a coupling device according to the invention.

FIG. 1 is a cross-sectional view of a coupling device according to the invention. The coupling device, shown generally at 10, comprises a generally cylindrical compressible body 12 preferably formed from a flexible and resilient molded plastic such as polyethylene or polypropylene, and having a fiber-receiving bore 14 extending axially therethrough.

The body 12 comprises a central portion 12A of generally increasing diameter and a pair of end portions 12B, 12C and is designed to gently guide and hold a pair of optical fibers, such as those shown at 16, 18, in end-to-end abutment in a region 20 generally encompassed by central portion 12A. The fibers 16, 18 are enclosed in a protective jacketing material 26 which has been removed from a segment of each fiber at 22, 24 in preparation for coupling. The bore 14 is oversized with respect to the accommodated fiber dimensions so that fibers of varying sizes, within tolerances of fiber production, may be inserted into the body 12. The compressible body may typically have a central portion with an outside diameter of 0.375 to 0.500 inches (0.954 to 1.27 cm), end portions of 0.125 to 0.250 inches (0.318 to 0.635 cm) OD, and a bore sized approximately 0.0005 to 0.002 inches (0.013 to 0.05 mm) larger than the accommodated fiber.

As shown in FIG. 1, the bore includes an inner portion 14A sized to receive only the bare fiber segments, but oversized with respect thereto so that the segments 22, 24 may be inserted into the device without subjection to the damaging stresses accompanying such insertions into devices known in the art. The bore 14 may additionally include a pair of outer portions 14B, 14C sized to receive the jacketed fiber and communicating with opposite ends of the inner portion 14A through a pair of tapered regions 31, 32, which guide the bared fiber segments, i.e., fiber segments with the jacketing unmoved into the inner bore portion.

Circumferential restraining shoulders 28, 30, respectively formed at the interface of the tapered and outer regions of the bore, limit the depth to which the fibers are inserted by contacting the leading edge 50 of the fiber jacket. Ideally, the bared fiber segments 22, 24 will have been sized according to the known distances between the restraining surfaces 28, 30, and the abutment region 20 so that the tips abut just as each shoulder contacts a respective jacket edge.

In practice, however, an excessive length of fiber may be bared so that the tips abut prior to contact between the jacket and shoulder. To prevent the consequential subjection of the fibers to the potentially damaging compressional stresses accompanying further insertion into the coupling device, the tapered regions 31, 32 also serve to deflect and accumulate any bared excess.

The bared segment 24 of the fiber 18 is illustratively shown as having been so deflected by its abutment with the tip of the fiber 16 prior to contact between the jacket 50 and shoulder 30. It may be noted that fiber 16 is partially withdrawn from the device 10 for clarity.

Once the fibers have been inserted into the opposite ends of the bore, the bore cross-section may be reduced to a fiber-engaging dimension by the application of a laterally directed compressional force about the compressible body 12. A symmetrically applied force about the central body portion 12A will reduce the central bore 14A cross-section in a manner which causes self-alignment of the abutting fibers. Accordingly, the central body portion 12A is externally threaded, as at 36, to mate with an internally threaded first rigid housing member such as a nut 34 preferably formed from metal, acetal, or polycarbonate.

The internal cavity of the nut 34 comprises a threaded lead-in region 51 and a tapered section 52 at least a portion of which is undersized with respect to the central body 12A. It may be seen that the threaded central body portion 12A is engaged by the lead-in 51 and compressed by the tapered region 52 as the nut 34 advances toward the left. The tapered region 52 thereby encompasses the fiber-abutting region 20 in the manner previously described. It may be appreciated that excessive compressional forces generated, for example, by an excessive size difference between the nut and the central body portion which could otherwise crack the fiber, are distributed instead by the additional compression of the body material.

A high degree of mechanical strength is added to the splice by similarly compressing the end portions 12B, 12C of the body 12 to reduce the outer bore portions 14B, 14C to a jacket-engaging dimension. The compression is accomplished by means of a pair of rigid-housing members 38, 40, formed preferably from metal, acetal or polycarbonate and which respectively encompass the end portions 12B and 12C. Each housing member 38, 40 respectively has an internal cavity formed axially therethrough which includes an internally threaded lead-in region 71, 72 and a tapered region 69, 70, at least a portion of which is undersized with respect to the end portions 12B, 12C of the compressible body 12. As shown in FIG. 1, the tapered regions 69, 70 compress the compressible end portions 12B, 12C as lead-in regions 71, 72 rotatably progress along the compressible body. The tightening of the housing members onto the end portions generates a symmetrical compressional force which reduces the enclosed outer bore portions 14B, 14C to a jacket-engaging dimension. Consequently, the jackets are firmly clamped so that stresses induced in the area of the splice are distributed along the fiber jacket and isolated from the fiber.

Spliced fibers are typically subjected to an additional source of potentially damaging stresses related to bending at their respective entry points while held within the coupling device. The magnitude of the stresses increases with the angle of the bend and with decreasing bend radius, so that it is desirable to prevent excessive bending of the fibers where they enter the coupling device. Accordingly, the end portions 12B, 12C of the compressible body 12 protrude axially outward beyond their respective rigid housings as at 42, 44, to flexibly support the jacketed fibers away from the coupling device and thereby limit the angle of bending and maximize the bend radius.

Figure 2:
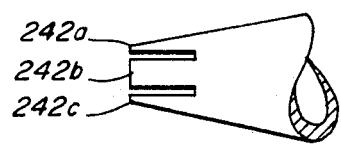
FIG. 2 is a fragmented elevation view of the compressible body showing the end portion thereof.

To enhance the deformability of the protruding end portions 12B, 12C, they may be shaped as shown in FIG. 2.

FIG. 2 is a fragmented elevation view of one end portion of the compressible body which is shown to comprise a plurality of jaws 242A, 242B, 242C. The wedge-shaped cavity of the housings 38, 40 (FIG. 1) compresses the jaws in the manner of a three-jaw chuck to secure the jacketed fiber therebetween.

The preferred method for splicing the fibers 16, 18 may be detailed with reference to FIG. 1. In preparation for the splicing operation, the protective jacketing 26 is removed from each fiber 16, 18 and the fiber ends prepared so that the bare segment 22, 24 has a length approximately equal to or slightly greater than the space between the shoulders 28, 30 and the abutment region 20. The nut 34 and housing 40 are slipped onto the end portion 12C of the body 12, and the fiber 18 is inserted within end 14C of the bore 14 until the shoulder 50 of the jacket 26 contacts the restraining shoulder 30. The housing 40 is then tightened onto the end portion 12C, thereby uniformly tightening the end portion about the jacket 26 on the fiber 18. Index matching fluid is then injected into the abutment region through the channel 46. Similarly, the housing 38 is placed on the end portion 12B, and the fiber 16 is inserted through the remaining end of channel 14 until the shoulder 50 of the jacket material 26 engages the restraining surface 28.

The housing 38 is then tightened onto the end portion 12B, utilizing the mating screw threads therebetween and the jacket portion of the fiber 16 is thereby clamped. Once the two fibers are thus secured, the nut 34 is tightened onto the central portion 12A in the previously described manner.

Because the nut 34 and the housings 38, 40 may be unscrewed to release the fibers and the jackets from the body 12, it is apparent that the splice may be easily removed. Additionally, the coupling device is reusable and the released fibers may be repeatedly spliced without further appreciable preparation.

Having described the self-aligning and splice-strengthening features of the invention, attention is turned to constructional details which enhance the ease with which the splicing may be performed. Turning first to the assembly of the device 10 during the splicing operation, the nut 36 may be mounted onto the body 12 in a number of ways. The inside diameter of the nut 34 may, in the first instance, be larger than the outside diameter of the housings 38, 40 and may therefore be simply slipped over the housings and tightened onto the central body portion 12A.

Alternatively, the nut 34 may be incorporated by design into either of the housings 38, 40 so that the clamping of the second fiber and the alignment operations are performed together. Finally, as shown in FIG. 1, the central end portion 12A may be elongated to provide a storage area 78 for the nut 34, where it may remain without generating compressional forces on the body 12.

To increase the thread strength of the externally threaded compressible body, another embodiment of the subject invention comprises a resilient compressible material molded within a series of externally threaded rigid shells. The features of this embodiment may be best described with reference to FIG. 3.

Figure 3:
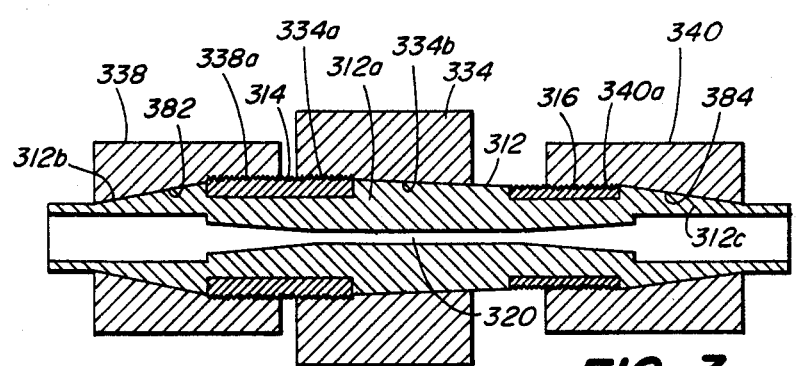
FIG. 3 is a sectional view of a coupling device in accordance with another embodiment of the invention.

FIG. 3 is a sectional view of another embodiment of a coupling device constructed according to the invention. For simplicity, only the differences from previously described embodiments will be discussed. With reference to FIG. 3, a resiliently compressible body of material 312 is encircled by, and extends axially through, a plurality of rigid, axially spaced, generally co-axial, essentially annular shells 314, 316 which may preferably be formed from metal, acetal, or polycarbonate. The material 312 may be molded within the shells so that the shells are securely embedded therein.

The shells are externally threaded to retainingly engage internally threaded cavities 334A, 338A, 340A of members 334, 338, 340, so that respective wedge-shaped cavity portions thereof 334B, 382, 384 compressingly contact the material 312.

The threaded cavity portions are sized to engage the shells without exerting substantial compressional forces thereon, since the shells do not compress the material 312 but simply lead the housing members therealong. The shells are accordingly offset from the areas to be compressed, thereby allowing the housings to engage the exposed compressible material encompassing those areas. It may be seen, for example, that the shell 314 is axially adjacent to and radially outward from the abutting region 320 where the opposing fiber tips meet; the central portion 312A of the compressible material 312 which encompasses the region 320 is thereby exposed for squeezing contact by the wedge-shaped portion 334B of the housing member 334.

In practical applications, it is commonly desirable to splice cables containing a plurality of optical fibers and the above-described coupling technique may be easily adapted for splicing such cables. For illustrative purposes, a typical number of 12 fibers per cable will be assumed although any number of fibers may be accommodated in the manner to be described, within obvious structural limitations.

Figure 4:
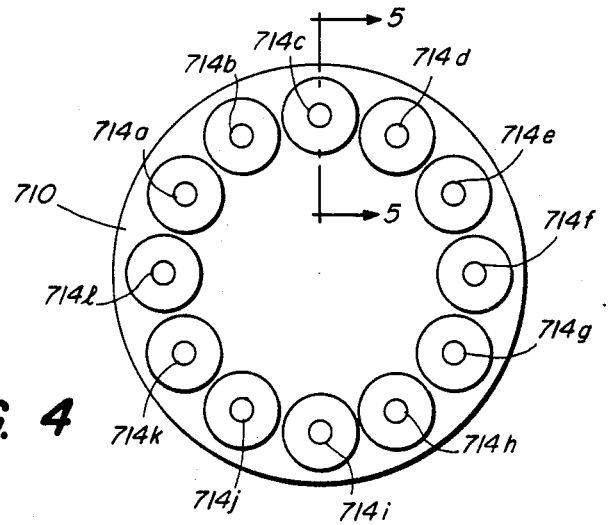
FIG. 4 is a cross-sectional view of a coupling device for multi-fiber cables.

In FIG. 4, a cross-section of a coupling device for multi-fiber cables is shown. A body 710 includes a radially disposed pattern of peripheral bores 714A–L extending axially therethrough. The body 710 may be, in one embodiment, a rigid structure for holding a plurality of resiliently compressible bodies, or may itself comprise a resiliently compressible material. These alternative embodiments may be better described in conjunction with FIGS. 5A and 5B.

Figure 5A:
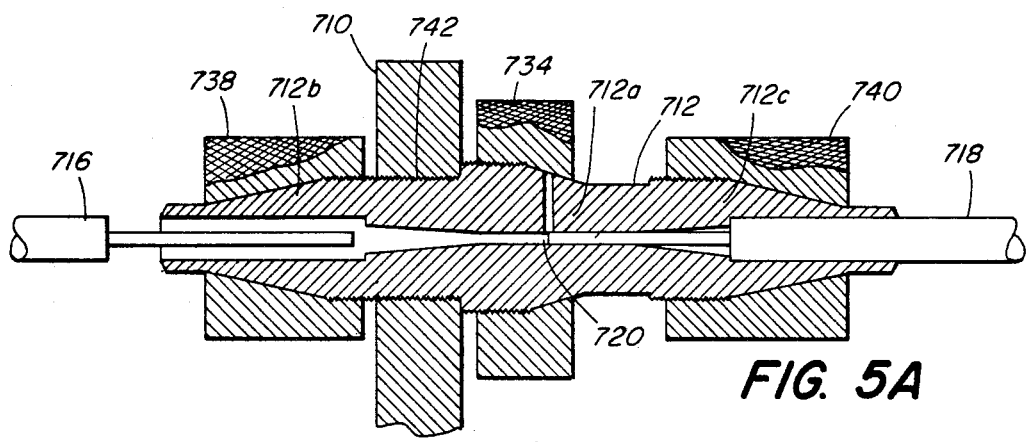
FIGS. 5A, 5B are fragmented sectional views showing alternative configurations of the coupler of FIG. 4 and are respectively taken along lines 5—5 therein.
Figure 5B:
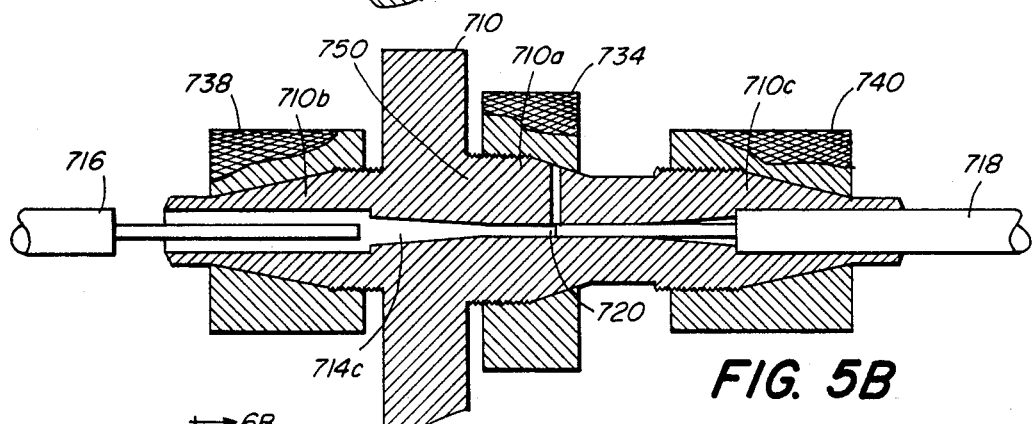

FIGS. 5A and 5B are fragmented sectional views of the body of a coupling device taken along line 5—5 in FIG. 4 and showing alternative embodiments for a multi-fiber cable. Although constructional details of these embodiments are similar to those of the embodiment depicted in FIG. 1, it is understood that any alternative construction, such as one related to the embodiment of FIG. 3, could be similarly utilized.

Referring first to FIG. 5A, the end portion 712C of the compressible body 712 is threaded through the bore 742 of the rigid body 710. In the manner previously described, a pair of opposing fibers 716, 718 from a pair of multi-fiber cables are inserted into the compressible body and secured by the tightening of housings 738, 740. The nut 734 is then tightened onto the central body portion 712A to align the fibers.

FIG. 5B shows an alternative embodiment wherein the body 710 comprises a molded resiliently compressible material which essentially integrates the plurality of individual compressible bodies, associated with the embodiment of FIG. 5A, into a single piece at a region 750 adjacent to the central body portion 710A. The body 710 thereby comprises a plurality of radially disposed pairs of opposing protuberances, such as 710B, 710C extending axially outward from the body 710 and encompassing a respective fiber receiving bore, such as 714C. The body 710 is adapted to hold each pair of abutting fiber ends within a region such as 720 so that, as in FIG. 5A, a total of three housing members 734, 738, 740 per fiber pair are mounted on each protuberance pair to secure and align the abutting fibers in each bore.

Figure 6A:
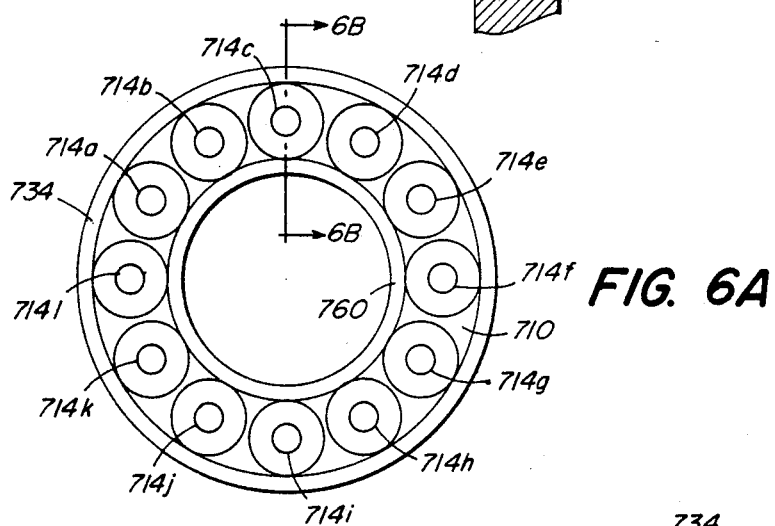
FIGS. 6A and 6B are respectively cross-sectional and fragmented sectional views of a second coupling device for multi-fiber cables made in accordance with the invention.
Figure 6B:
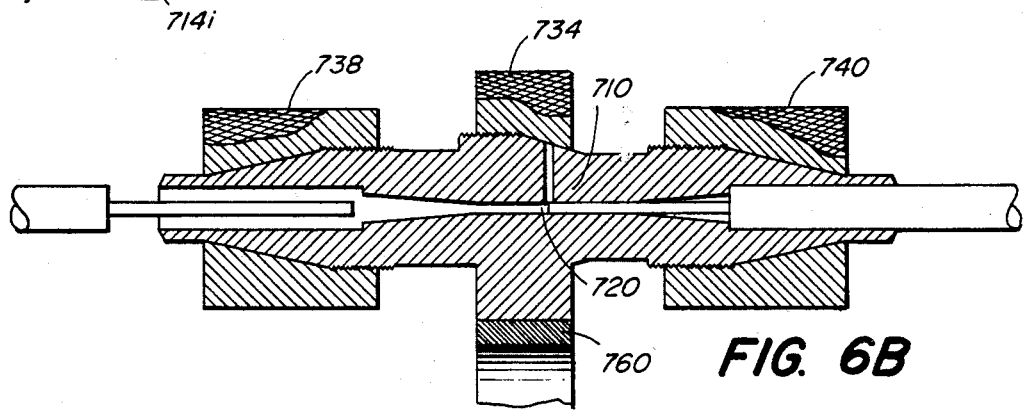

Turning to FIGS. 6A and 6B, a third alternative is provided. The opposing protuberance pairs are now integrated at the central body portions, by a process such as molding. The compressible body 710 is annular and disposed about a rigid ring 760. The body 710 is adapted to hold each pair of abutting fiber tips in the region 720, as before. The nut 734 is sized to encompass the entire central portion of body 710, rather than each protuberance, thereby simultaneously aligning the plurality of fiber pairs when tightened onto the body 710. The outer diameter of the ring 760 is sized to provide an approximately equal material thickness around the individual couplers to equalize the corresponding forces acting thereon.

Naturally, there are variations in the described embodiments and methods which are obvious to one skilled in the art. It should be noted, for example, that the fiber-engaging areas of the bore wall do not necessarily have to contact the fibers directly, but may engage them through an intermediate medium. These changes and modifications may be made without departing from the spirit of the invention as defined by the appended claims.

We claim:
1. A device for coupling a pair of protectively jacketed optical fibers in axial alignment comprising:
a resiliently compressible body for holding a pair of opposing fibers in end-to-end abutment in an abutment region, the body receiving the fiber pair through opposite ends of a fiber-receiving bore formed axially therethrough, the bore having an oversized cross-section with respect to the cross- sections of the received fibers, wherein the bore includes an inner portion for receiving bared ends of the fiber pair and a pair of outer portions for receiving the jacketed portion of the fibers; and body compression means for forming a plurality of fiber-engaging areas along the bore wall in the abutment region to exert a lateral aligning force on the abuttingly held fiber tips, and wherein the body compression means includes first means for symmetrically reducing the cross-section of the inner bore portion to a fiber-engaging dimension and second means for reducing the cross-section of the outer bore portions to a jacket-engaging dimension.

2. The device of claim 1 wherein the body has a generally cylindrical exterior central portion encompassing the abutment region, and a pair of generally cylindrical exterior end portions encompassing the outer bore portions, the body being externally threaded; and the first means includes a first rigid housing member having a central cavity extending axially therethrough substantially surrounding the central portion of the compressible body, the cavity being internally threaded along a lead-in region to mate with the external threading of the body, and having a cavity portion undersized with respect to the body for exerting a symmetrical compression force thereon.

3. A device for coupling a pair of protectively jacketed optical fibers in axial alignment comprising:

a resiliently compressible body for holding a pair of opposing fibers in end-to-end abutment in an abutment region, the body receiving the fiber pair through opposite ends of a fiber-receiving bore formed axially therethrough, the bore having an oversized cross-section with respect to the cross-sections of the received fiber, and including an inner portion for receiving bared ends of the fiber pair and a pair of outer portions for receiving the jacketed portion of the fiber, the body having a generally cylindrical exterior central portion encompassing the abutment region, a pair of generally cylindrical exterior end portions encompassing the outer bore portions, and a surface of generally increasing diameter extending axially from one of the end portions, the body being externally threaded;

first means for symmetrically reducing the cross-section of the inner bore portion to a fiber-engaging dimension including a first rigid housing member having a central cavity extending axially therethrough substantially surrounding the central portion of the compressible body, the cavity being internally threaded along a lead-in region to mate with the external threading of the body and having an undersized cavity portion with respect to the central body portion for exerting a symmetrical compression force thereon; and second means for reducing the cross-section of the outer bore portions to a jacket-engaging dimension.

4. For use in an optical communication system, a coupling device for splicing a pair of multi-fiber cables comprising:

a body of resiliently compressible material having an opposing, axially extending plurality of protuberance pairs radially disposed about its central axis;

each pair of opposing protuberances encompassing a fiber receiving bore extending axially therethrough, the body being adapted to loosely hold a pair of opposing optical fibers in end-to-end abutment within each bore;

first means for compressing the body adjacent to the bore ends to secure the abutting fibers therein; and second means for compressing those portions of the body encompassing the abutting fiber tips to reduce the bore cross-section to a fiber-engaging dimension and mutually align the opposing fibers, including a plurality of housing members each having an internal cavity for mounting a respective protuberance, at least a portion of each cavity being undersized with respect thereto to generate a symmetrical compressional force thereon.

5. For use in an optical communication system, a coupling device for splicing a pair of multi-fiber cables comprising:

a body of resiliently compressible material having a plurality of generally opposing generally axially extending protuberance pairs radially disposed about its central axis, each pair of opposing protuberances encompassing a fiber receiving bore being sized to freely admit a pair of opposing optical fibers and hold them in end-to-end abutment interjacent to the opposing protuberance pair;

first means for compressing the body adjacent to the bore ends to secure the abutting fibers therein; and a housing member having a cavity mounted about the interjacent body portion, at least a portion of the cavity being undersized with respect thereto so as to exert a symmetrical compression force thereon thereby reducing the bore cross-section to a fiber-engaging dimension to mutually align the opposing fibers.

6. A device for coupling a pair of protectively jacketed optical fibers in axial alignment comprising:

a resiliently compressible body for holding a pair of opposing fibers in end-to-end abutment in an abutment region, the body receiving the fiber pair through opposite ends of a fiber-receiving bore formed axially therethrough, the bore having an oversized cross-section with respect to the cross-sections of the received fibers, and including an inner portion for receiving bared ends of the fiber pair and a pair of outer portions for receiving the jacketed portion of the fibers;

the body having a generally cylindrical exterior central portion encompassing the abutment region, a pair of generally cylindrical exterior end portions encompassing the outer bore portions, including second and third rigid housings, each having an axially extending cavity formed therethrough substantially surrounding a respective end portion of the body, each cavity including an internally threaded lead-in region for mating with the external threads of the compressible body and a cavity region which is undersized with respect to the end portion for exerting a compressible force on the body to securely hold the jacketing of the respectively inserted fiber, the body being externally threaded;

first means for symmetrically reducing the cross-section of the inner bore portion to a fiber-engaging dimension, including a first rigid housing member having a central cavity extending axially therethrough substantially surrounding the central portion of the compressible body, the cavity being internally threaded along a lead-in region to mate with the external threading of the body, and having a cavity portion of the cavity being undersized with respect to the central body portion for exerting a symmetrical compression force thereon; and second means for reducing the cross-section of the outer bore portions to a jacket-engaging dimension.

7. The device of claim 6 wherein at least one of the end portions is elongated to provide a storage area for the untightened first housing.

8. The device of claim 6 wherein the housing cavities each include a tapered region of decreasing cross-section extending axially from the lead-in region to form the undersized cavity region 9. The device of claim 6 wherein each body end portion protrudes axially outwardly beyond its respective rigid housing to flexibly support the jacketed fiber away from the device.

10. The device of claim 6 wherein a restraining shoulder is formed at the interfaces between the inner channel portions and each outer portion to control the depth of the fiber insertion by contacting the leading jacket edge of the fiber.

11. For use in an optical communication system, a coupling device for splicing a pair of multi-fiber cables comprising:

a body of resiliently compressible material having a plurality of generally parallel bores radially disposed about its central axis and extending axially therethrough, the body being adapted to loosely hold a pair of opposing optical fibers in end-to-end abutment within each bore;

first means for compressing the body adjacent to the bore ends to secure the abutting fibers therein; and second means for compressing those portions of the body encompassing the abutting fiber tips to reduce the bore cross-section to a fiber-engaging dimension and mutually align the opposing fibers.

12. The coupling device of claim 11 wherein the body includes a plurality of radially disposed pairs of opposing protuberances, each pair of opposing protuberances extending axially outward from the body and encompassing a fiber receiving bore.

13. A device for coupling a pair of protectively jacketed fibers in axial alignment comprising:

a plurality of rigid, axially spaced, generally co-axial essentially annular shells;

a resiliently compressible body of material encircled by, and extending axially through, the plurality of shells for holding the bared end segments of a pair of opposing protectively jacketed fibers in end-to-end abutment, the body receiving the jacketed fiber pair through opposite ends of a fiber-accommodating bore formed axially therethrough and oversized with respect to the cross-sections of the accommodated fibers, the abutting bared ends of the opposing fibers being held radially inward from, and axially adjacent to, one of the shells;

a first housing member having an axially extending internal cavity including a first shell-engaging cavity portion and a second body-contacting cavity portion, the first cavity portion wall being retainingly engaged by the periphery of said one shell to maintain the second cavity portion wall in symmetrically compressing contact with the resilient body axially adjacent to said one shell and encompassing the abutting fiber tips, whereby the bore cross-section is reduced to a fiber-engaging dimension to hold the fibers in axial alignment;

second and third housing members, each having an axially extending internal cavity including a first shell-engaging cavity portion and a second body-contacting cavity portion, the first cavity portion wall being retainingly engaged by the periphery of a shell located radially outward from, and axially adjacent to, a jacket-accommodating section of the bore, to maintain the second cavity portion wall in compressing contact with a jacket-encompassing segment of the resilient body, whereby the bore cross-section is reduced to a jacket-clamping dimension.

14. The coupling device of claim 13 wherein the resilient material is molded within the shells.

15. The coupling device of claim 13 wherein the shells are externally threaded and the first cavity portions of the housing members are internally threaded to mate therewith, whereby the second cavity portions are led into compressing engagement with the resilient body as the housing members are tightened onto the shells.

16. A method for splicing a pair of protectively jacketed optical fibers in axial alignment comprising the steps of:

(a) removing the jacketing from one end of each fiber to expose a length of bare fiber;

(b) inserting the exposed end of one fiber into one end of a fiber-receiving channel extending axially within a compressible body;

(c) inserting the exposed end of the second fiber into the other end of the channel until the fibers are in end-to-end abutment;

(d) compressing the body about the fibers to exert lateral aligning forces on the fibers; and (e) tightening an internally threaded internally tapered nut onto the externally threaded generally cylindrical body portion that encloses the abutting fiber ends, a portion of the internal taper being undersized with respect to the diameter of the body, whereby symmetrical compressional forces are applied to the body.

17. The method of claim 16 including the steps of inserting the fibers into the channel ends until a portion of the jacketed segment of each fiber is within the body; and compressing the body about the jacketed segments to exert a clamping force thereon through the channel wall.

18. The method of claim 17 including the step of tightening an internally threaded housing onto each externally threaded generally cylindrical end portion of the body which encloses the jacketed segment of each optical fiber, the inside diameter of at least a portion of each housing being undersized with respect to the diameter of the respective end portion to generate a fiber-clamping force therethrough.

* * * * *